(12) United States Patent
Dos Santos Paiva et al.

(10) Patent No.: US 12,044,606 B2
(45) Date of Patent: Jul. 23, 2024

(54) DEVICE AND METHOD FOR DETECTING AND IDENTIFYING EXTRACELLULAR VESICLES IN A LIQUID DISPERSION SAMPLE

(71) Applicant: INESC TEC—INSTITUTO DE ENGENHARIA DE SISTEMAS E COMPUTADORES, TECNOLOGIA E CIÊNCIA, Oporto (PT)

(72) Inventors: Joana Isabel Dos Santos Paiva, Oporto (PT); João Paulo Trigueiros Da Silva Cunha, Oporto (PT); Pedro Alberto Da Silva Jorge, Oporto (PT)

(73) Assignee: INESC TEC—INSTITUTO DE ENGENHARIA DE SISTEMAS E COMPUTADORES, TECNOLOGIA E CIÊNCIA, Oporto (PT)

( * ) Notice: Subject to any disclaimer, the term of this patent is extended or adjusted under 35 U.S.C. 154(b) by 532 days.

(21) Appl. No.: 17/290,675

(22) PCT Filed: Oct. 31, 2019

(86) PCT No.: PCT/IB2019/059371
§ 371 (c)(1),
(2) Date: Apr. 30, 2021

(87) PCT Pub. No.: WO2020/089836
PCT Pub. Date: May 7, 2020

(65) Prior Publication Data
US 2021/0372910 A1    Dec. 2, 2021

(30) Foreign Application Priority Data

Oct. 31, 2018  (PT) .......................................... 115123
May 16, 2019  (EP) .................................... 19174940

(51) Int. Cl.
*G01N 15/0205*    (2024.01)
*G01N 15/00*    (2024.01)
(Continued)

(52) U.S. Cl.
CPC ..... *G01N 15/0211* (2013.01); *G01N 15/1429* (2013.01); *G01N 15/1434* (2013.01);
(Continued)

(58) Field of Classification Search
CPC .......... G01N 15/0211; G01N 15/1429; G01N 14/1434; G01N 2015/0053;
(Continued)

(56) References Cited

U.S. PATENT DOCUMENTS

2018/0311663 A1*  11/2018  Giera .................. G01N 15/1475
2020/0231927 A1*  7/2020  Masaeli ............. G01N 15/0205
2021/0209337 A1*  7/2021  Ozcan ................ G01N 33/1866

FOREIGN PATENT DOCUMENTS

WO    WO 2016097996 A1    6/2016

OTHER PUBLICATIONS

Steinbichler, T., Dudás, J., Riechelmann, H. & Skvortsova, I. The role of exosomes in cancer metastasis. Seminars in cancer biology 44, pp. 170-181 (2017).
(Continued)

*Primary Examiner* — Michael A Lyons
(74) *Attorney, Agent, or Firm* — Leason Ellis LLP

(57) ABSTRACT

Device and method for detecting dispersed extracellular vesicles in a liquid dispersion sample, said method using an electronic data processor for classifying the sample as having, or not having, extracellular vesicles present, the method comprising the use of the electronic data processor for pre-training a machine learning classifier with a plurality of extracellular vesicle liquid dispersion specimens comprising the steps of: emitting a laser modulated by a modu- (Continued)

lation frequency onto each specimen; capturing a temporal signal from laser light backscattered by each specimen for a plurality of temporal periods of a predetermined duration for each specimen; calculating specimen DCT or Wavelet transform coefficients from the captured signal for each of the temporal periods; using the calculated coefficients to pre-train the machine learning classifier; wherein the method further comprises the steps of: using a laser emitter having a focusing optical system coupled to the emitter to emit a laser modulated by a modulation frequency onto the sample; using a light receiver to capture a signal from laser light backscattered by the sample for a plurality of temporal periods of a predetermined duration; calculating sample DCT or Wavelet transform coefficients from the captured signal for each of the temporal periods; using the pre-trained machine learning classifier to classify the calculated sample coefficients as having, or not having, extracellular vesicles present.

19 Claims, 4 Drawing Sheets

(51) Int. Cl.
   *G01N 15/01*     (2024.01)
   *G01N 15/10*     (2024.01)
   *G01N 15/14*     (2024.01)
   *G01N 15/1429*   (2024.01)
   *G01N 15/1434*   (2024.01)

(52) U.S. Cl.
   CPC ..... *G01N 2015/0053* (2013.01); *G01N 15/01* (2024.01); *G01N 2015/0238* (2013.01); *G01N 2015/1006* (2013.01); *G01N 2015/1488* (2013.01); *G01N 2015/1493* (2013.01)

(58) Field of Classification Search
   CPC ... G01N 2015/0065; G01N 2015/0238; G01N 2015/1006; G01N 2015/1488; G01N 2015/1493
   See application file for complete search history.

(56) References Cited

OTHER PUBLICATIONS

Welsh, J., Holloway, J., Wilkinson, J. & Enlyst, N. Extracellular vesicle flow cytometry analysis and standardization. Frontiers in Cell and Developmental Biology 5, 78 (2017).
Mei, Z., Wu, T., Pion-Tonachini, L., Qiao, W., Zhao, C., Liu, Z., and Lo, Y., "Applying an optical space-time coding method to enhance light scattering signals in microfluidic devices," Biomicrofluidics 5(3), 034116 (2011).
Wu, T., Cho, S., Chiu, Y., and Lo, Y., "Lab-on-a-Chip Device and System for Point-of Care Applications," Handbook of Photonics for Biomedical Engineering, 87-121 (2017).
Joana Paiva et al, "Single Particle Differentiation through 2D Optical Fiber Trapping and Back-Scattered Signal Statistical Analysis: An Exploratory Approach", Sensors, vol. 18, No. 3, Feb. 27, 2018.
Paiva Joana S et al, "Experimental and theoretical evaluation of the trapping performance of polymeric lensed optical fibers: single biological cells versus synthetic structures", Proceedings of SPIE; [Proceedings of SPIE ISSN 0277-786X vol. 10524], SPIE, US, vol. 10685, May 17, 2018, p. 106852W-106852W, XP060104541, DOI: 10.1117/12.2304358, ISBN: 9781510615335; the whole document; Relevant to claim No. 1-32.
Ana Rita et al, "Optical fiber tools for single cell trapping and manipulation Co-supervisor", ProQuest 10798764 Dec. 31, 2017, XP055662859; the whole document; Relevant to claim No. 1-32.
Rodrigues Ribeiro R S et al, "Rapid fabrication of polymeric micro lenses for optical fiber trapping and beam shaping", Proceedings of SPIE/ IS & T., vol. 9164, Sep. 16, 2014, p. 91642M-91642M, XP060039173, DOI: 10.1117/12.2060374, ISBN: 9781628417302; Relevant to claim No. 12-17.
Sandra Rodrigues et al, "Fabrication of Multimode-Single Mode Polymer Fiber Tweezers for Single Cell Trapping and Identification with Improved Performance", Sensors, vol. 18, No. 9, Aug. 21, 2018, p. 2746, XP055662863, DOI: 10.3390/s18092746; the whole document; Relevant to claim No. 1-32.
Joana S. Paiva et al., "Optical fiber-based sensing method for nanoparticle detection through supervised back-scattering analysis: A potential contributor for biomedicine", International Journal of Nanomedicine, Apr. 2019, pp. 2349-2369.

\* cited by examiner

DEVICE AND METHOD FOR DETECTING AND IDENTIFYING EXTRACELLULAR VESICLES IN A LIQUID DISPERSION SAMPLE

CROSS-REFERENCE TO RELATED APPLICATIONS

This application is a U.S. National Stage Application under 35 U.S.C. § 371 of International Patent Application No. PCT/IB2019/059371, filed Oct. 31, 2019, which claims priority to European Patent Application No. 19174940.7, filed May 16, 2019 and Portugal Patent Application No. 115123, filed Oct. 31, 2018, the contents of which are each hereby incorporated by reference in their respective entireties.

TECHNICAL FIELD

The present disclosure relates to a method and device for detecting extracellular vesicles (EVs).

BACKGROUND

Extracellular vesicles (EVs) have gathering an increasing interest from both Academia and Industry due to their high potential role in cell-to-cell communication and use as translational biomarkers for diagnosis and health assessment. The term EVs describes membranous vesicles derived from cells, ranging in diameter from 30 to 1000 nm with the majority thought to be in the region of 100-150 nm.

Due to their small size and complexity, conventional techniques have struggled to detect and identify EVs produced by different cell populations. In fact, with dimensions ranging from 100 to 150 nm, the use of optical means to detect EVs is challenging since it is far below from the light diffraction limit [1,2].

Currently, there is a lack of instruments compatible with the detection of particles in such size ranges, with Electron Microscopy[1,2], conventional and high-resolution flow cytometry[1,2], Nanoparticle Tracking Analysis[1,2] being the gold standard approaches to detect and quantify the EVs present in a sample.

Extracellular vesicle detection (mainly exosomes) using high-resolution flow cytometry is estimated to be used in 90% of biological-derived nanoparticles research [1,2]. Despite of the improvements on resolution included in these new methods in comparison with the conventional ones, it is still based on bulky and even more expensive equipment (requiring high power lasers, with a smaller focused beam spot size in comparison with the conventional method, for example)[2]. Furthermore, it continues to be dependent from the analysis of two kind of signals: the scattered and fluorescence signals, demanding expensive computational and control systems and being associated to a time-consuming analysis technique.

The amount of light scattered by a particle has been considered a gold-standard technique for simple particle characterization, given its dependence with crucial scattered characteristics such as particle diameter, refractive index, shape/geometry, composition, content type (synthetic, biologic) and type of interactions with the surrounding media [3-5]. Different cells or cellular organelles are often distinct in terms of their refractive index values due to the types of proteins expressed and intracellular cargo differences between them [5].

Neither of these documents teaches a method or a device that is suitable for detecting extracellular vesicles in liquid samples. These facts are disclosed in order to illustrate the technical problem addressed by the present disclosure.

REFERENCES

[1] Steinbichler, T., Dudás, J., Riechelmann, H. & Skvortsova, I. The role of exosomes in cancer metastasis. Seminars in cancer biology 44, 170-181 (2017).
[3] Mei, Z., Wu, T., Pion-Tonachini, L., Qiao, W., Zhao, C., Liu, Z., and Lo, Y., "Applying an optical space-time coding method to enhance light scattering signals in microfluidic devices," Biomicrofluidics 5(3), 034116 (2011).
[4] Wu, T., Cho, S., Chiu, Y., and Lo, Y., "Lab-on-a-Chip Device and System for Point-of-Care Applications," Handbook of Photonics for Biomedical Engineering, 87-121 (2017).
[5] Welsh, J., Holloway, J., Wilkinson, J., and Englyst, N., "Extracellular vesicle flow cytometry analysis and standardization," Frontiers in cell and developmental biology 5, 78 (2017).

GENERAL DESCRIPTION

A primary object of the present disclosure is a method and a device for detecting extracellular vesicles (EVs) in a liquid dispersion sample.

The proposed method and device can detect the presence of complex biologic nanoparticles (e.g., specific types of cancer exosomes) in complex liquid solutions. The disclosed method and device covers a range of detection regarding targets size between 30 nm and 24 µm.

The present disclosure is extremely useful for differentiating type of EVs in fast and simple embodiments.

In a particular embodiment, this device may be embedded in microfluidic micro chips for rapid clinical diagnosis or to be integrated in an automated food production system for yeasts/other micro-composites sorting and selection according with specific product criteria.

It is disclosed a device for detecting extracellular vesicles in a liquid dispersion sample, said device comprising a laser emitter; a focusing optical system coupled to the emitter; an infrared light receiver; and an electronic data processor arranged to classify the sample as having, or not having, extracellular vesicles present using a machine learning classifier which has been pre-trained using a plurality of extracellular vesicle liquid dispersion specimens by a method comprising:
  emitting a laser modulated by a modulation frequency onto each specimen;
  capturing a temporal signal from laser light backscattered by each specimen for a plurality of temporal periods of a predetermined duration for each specimen;
  calculating specimen DCT or Wavelet transform coefficients from the captured signal for each of the temporal periods;
  using the calculated coefficients to pre-train the machine learning classifier;
  wherein the electronic data processor is further arranged to:
  use the laser emitter to emit a laser modulated by a modulation frequency onto the sample;
  use the light receiver to capture a signal from laser light backscattered by the sample for a plurality of temporal periods of a predetermined duration;

calculating sample DCT or Wavelet transform coefficients from the captured signal for each of the temporal periods;

using the pre-trained machine learning classifier to classify the calculated sample coefficients as having, or not having, extracellular vesicles present.

It is also disclosed a method for detecting extracellular vesicles in a liquid dispersion sample, said method using an electronic data processor for classifying the sample as having, or not having, extracellular vesicles present, the method comprising the use of the electronic data processor for pre-training a machine learning classifier with a plurality of extracellular vesicle liquid dispersion specimens comprising the steps of:

emitting a laser modulated by a modulation frequency onto each specimen; capturing a temporal signal from laser light backscattered by each specimen for a plurality of temporal periods of a predetermined duration for each specimen;

calculating specimen DCT or Wavelet transform coefficients from the captured signal for each of the temporal periods;

using the calculated coefficients to pre-train the machine learning classifier;

wherein the method further comprises the steps of:

using a laser emitter having a focusing optical system coupled to the emitter to emit a laser modulated by a modulation frequency onto the sample;

using a light receiver to capture a signal from laser light backscattered by the sample for a plurality of temporal periods of a predetermined duration;

calculating sample DCT or Wavelet transform coefficients from the captured signal for each of the temporal periods;

using the pre-trained machine learning classifier to classify the calculated sample coefficients as having, or not having, extracellular vesicles present.

In an embodiment, the electronic data processor is further arranged to classify, if present, the extracellular vesicle into one of a plurality of extracellular vesicle type classes by using the machine learning classifier which has been pre-trained using a plurality of extracellular vesicle liquid dispersion specimen type classes.

In an embodiment, the laser is a visible light laser or an infrared laser or a combination, in particular an infrared laser, and the receiver is a visible light and infrared receiver.

In an embodiment, the laser is further modulated by one or more additional modulation frequencies.

In an embodiment, the specimen modulation frequency and the sample modulation frequency are identical.

In an embodiment, the specimen predetermined duration and the sample predetermined duration are identical.

In an embodiment, the captured plurality of temporal periods of a predetermined duration are obtained by splitting a captured temporal signal of a longer duration than the predetermined duration.

In an embodiment, the split temporal periods are overlapping temporal periods.

In an embodiment, the predetermined temporal duration is selected from 1.5 to 2.5 seconds, in particular 2 seconds.

In an embodiment, the electronic data processor is further arranged to pre-train and classify using time domain histogram-derived or time domain statistics-derived features from the captured signal, in particular the features: wNakagami; µNakagami; entropy; standard deviation; or combinations thereof.

In an embodiment, the focusing optical system is a convergent lens.

In an embodiment, the focusing optical system is a convergent lens which is a polymeric photoconcentrator arranged at the tip of an optical fibre or waveguide.

In an embodiment, the focusing optical system is a focusing optical system suitable to provide a field gradient pattern, in particular a polymeric lens, fibre taper, amplitude or phase fresnel plates, or any of the later with added gold film or films having a thickness and nano or micro holes or array of holes for plasmonic effects.

In an embodiment, the lens has a focusing spot corresponding to a beam waist of ⅓th to ¼th of a base diameter of the lens.

In an embodiment, the lens has a Numerical Aperture, NA, above 0.5.

In an embodiment, the lens has a base diameter of 5-10 µm, in particular 6-8 µm.

In an embodiment, the lens is spherical and has a length of 30-50 µm, in particular 37-47 µm.

In an embodiment, the lens has a curvature radius of 2-5 µm, in particular 2.5-3.5 µm.

In an embodiment, the infrared light receiver is a photoreceptor comprising a bandwidth of 400-1000 nm.

In an embodiment, the calculation of transform coefficients comprises selecting a minimum subset of transform coefficients such that a predetermined percentage of the total energy of the signal is preserved by the transform.

In an embodiment, the number of the minimum subset of DCT transform coefficients is selected from 20 to 40, or from 20, 30 or 40.

In an embodiment, the signal capture is carried out at least with a sampling frequency of at least five times the modulation frequency.

In an embodiment, the signal capture comprises a highpass filter.

In an embodiment, the modulation frequency is equal or above 1 kHz.

In an embodiment, the extracellular vesicles have a particle size in any particle direction below 1 m or between 30 nm and 30 µm.

It is also disclosed a non-transitory storage media including program instructions for implementing a method for detecting extracellular vesicles in a liquid dispersion sample, the program instructions including instructions executable by an electronic data processor to carry out the method of any of the disclosed embodiments.

Alternatively to the DCT or Wavelet transform, both DCT and Wavelet transforms may be used, or another time series dimensionality-reduction transform may be used, or multiple time series dimensionality-reduction transforms may be used.

In an embodiment, the time series dimensionality-reduction transform is the discrete cosine transform, DCT.

In an embodiment, the time series dimensionality-reduction transform is the wavelet transform.

In an embodiment, the wavelet types are Haar and Daubechies (Db10).

The disclosure may be explained by the distinct response of different types of nanoparticles to a highly focused electromagnetic potential. Two types of phenomena may then contribute for this distinct response among different types of nanostructures: its Brownian movement pattern in the liquid dispersion and/or its different optical polarizability, intrinsically correlated with its microscopic refractive index. Therefore, Brownian movement pattern and/or optical polarizability are exposed by the DCT and wavelet-derived parameters extracted from the backscattering light, which are used by the said pre-trained machine learning classifier to classify extracellular vesicles.

In this case, the disclosure uses the distinctive time-dependent fluctuations in scattering intensity caused by constructive and destructive interference resulting from both relative Brownian movement of nanoparticles in the liquid dispersion, dictated by the particle diffusivity in the dispersion—parameter that only depends on particle size—and the response to the highly focused electromagnetic potential, that depends on the optical polarizability of the particle. The superposition of these two effects allows EVs distinction with the same size, which is not possible using the state-of-the-art light-scattering based methods.

The disclosure is applicable to nanoparticles or microparticles showing distinctive time-dependent fluctuations in scattering intensity caused by constructive and destructive interference resulting from relative Brownian movement of nanoparticles in the liquid dispersion sample affecting back-scattered light and distinct optical polarizabilities (or microscopic refractive indexes).

The disclosure detects and identifies nanoparticles with predetermined diameter, and/or refractive index, and/or optical polarizability.

The disclosure is also applicable to individual cells, wherein the device may be used for detecting an individual cell in a liquid dispersion sample. Furthermore, the disclosure is also applicable for classifying an individual cell in a liquid dispersion sample. These may be preferably trapped for the measurement. The cell may be an individualised cell, in particular an individualised human cell, or an unicellular micro-organism. For example, optical fibre tweezers with sensing abilities are able to provide meaningful and specific information about an individualized target particle, stably trapped during measurement.

In particular, the disclosure is applicable to detect post translational modifications, for example phosphorylation or glycosylation incidents like shorter or truncated O-glycans which are considered predictive markers of poor prognosis in certain cancers. These phenomena are frequently associated with an incomplete glycans synthesis during cell glycosylation.

BRIEF DESCRIPTION OF THE DRAWINGS

The following figures provide preferred embodiments for illustrating the description and should not be seen as limiting the scope of invention.

DETAILED DESCRIPTION

The disclosure is described in more detail below.

Figure 1:
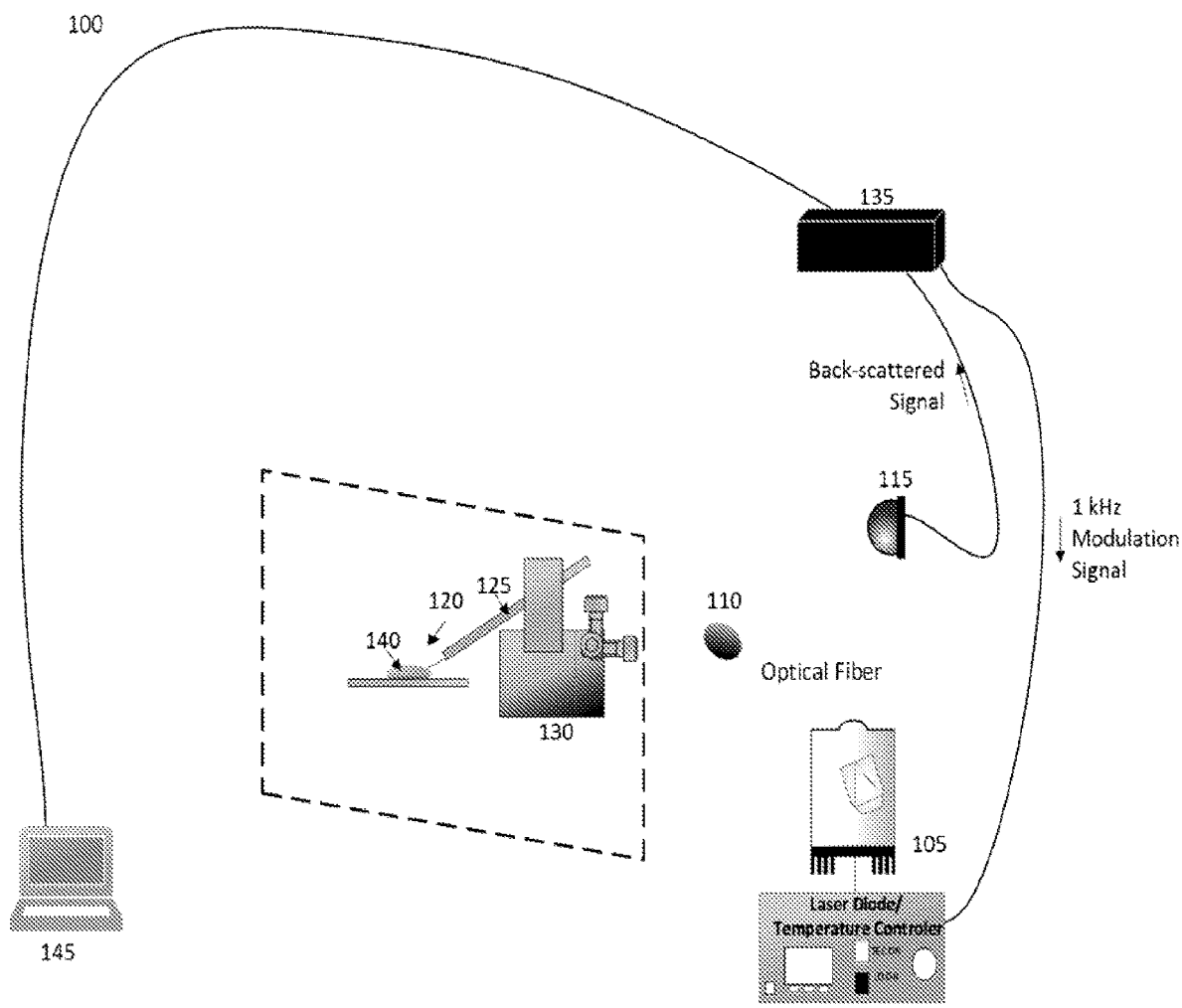
FIG. 1: Schematic representation of the optical setup according to an embodiment.

In FIG. 1 an optical setup is depicted (100). A pigtailed 980 nm laser (500 mW, Lumics, ref. LU0980M500) (105) was included in the optical setup. A 50/50 fiber coupler with a 1×2 topology (110) is used for connecting two inputs—the laser (105) and the photodector (115) (back-scattered signal acquisition module). The optical fiber tip (120) was then spliced to the output of the fiber coupler (110) and inserted into a metallic capillary (125) controlled by the motorized micromanipulator (130). This configuration allowed both laser light guidance to the optical fiber tip (120) through the optical fiber and the acquisition of the back-scattered signal through a photodetector (PDA 36A-EC, Thor/abs) (115). In addition to the photodetector, the back-scattered signal acquisition module was also composed by an analog-to-digital acquisition board (National Instruments DAQ) (135), which was connected to the photodetector (115) for transmitting the acquired signal to the laptop where it is stored for further processing (145). A digital-to-analog output of the DAQ (135) was also connected to the laser for modulating its signal using a sinusoidal signal with a fundamental frequency of 1 KHz. A liquid sample (140) is loaded over a glass coverslip and a fiber with the photoconcentrator (120) on its extremity is inserted into the sample.

Figure 2:
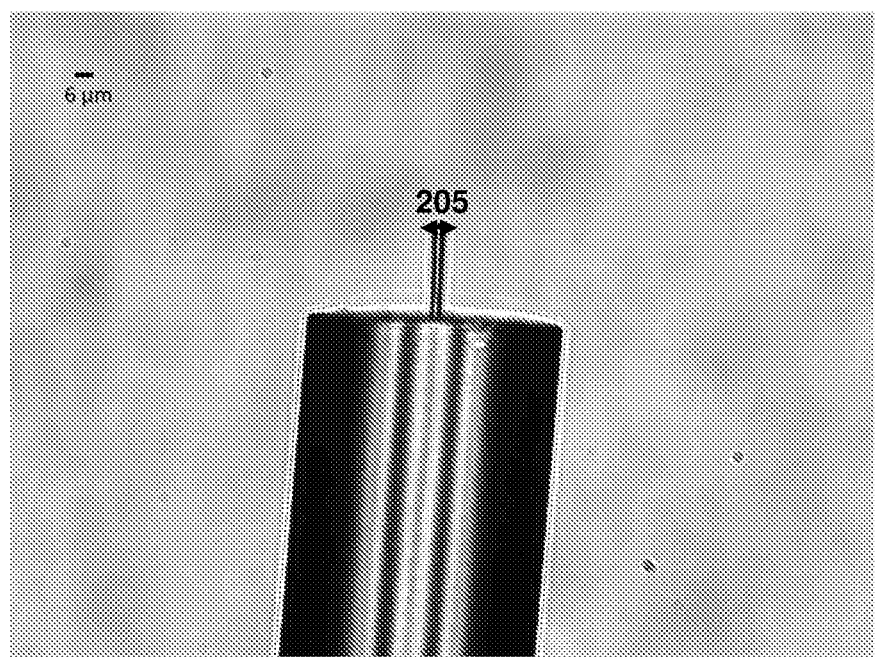
FIG. 2: Schematic representation of the optic concentrator according to an embodiment.

The type of photoconcentrator is presented in FIG. 2 and consists in a polymeric lens fabricated through a guided wave photopolymerization method. This photoconcentrator is characterized by a converging spherical lens with a NA>0.5, able to focus the laser beam onto a highly focused spot corresponding to a beam waist of about ⅓-¼th of the base diameter of the lens. Additionally, a base diameter between 6-8 μm (205) and a curvature radius between 2-3.5 μm is also a suitable solution. The fiber tip with the photoconcentrator is immersed into the liquid sample and the back-scattered signal is acquired considering different locations of the tip in the solution.

Figure 3:
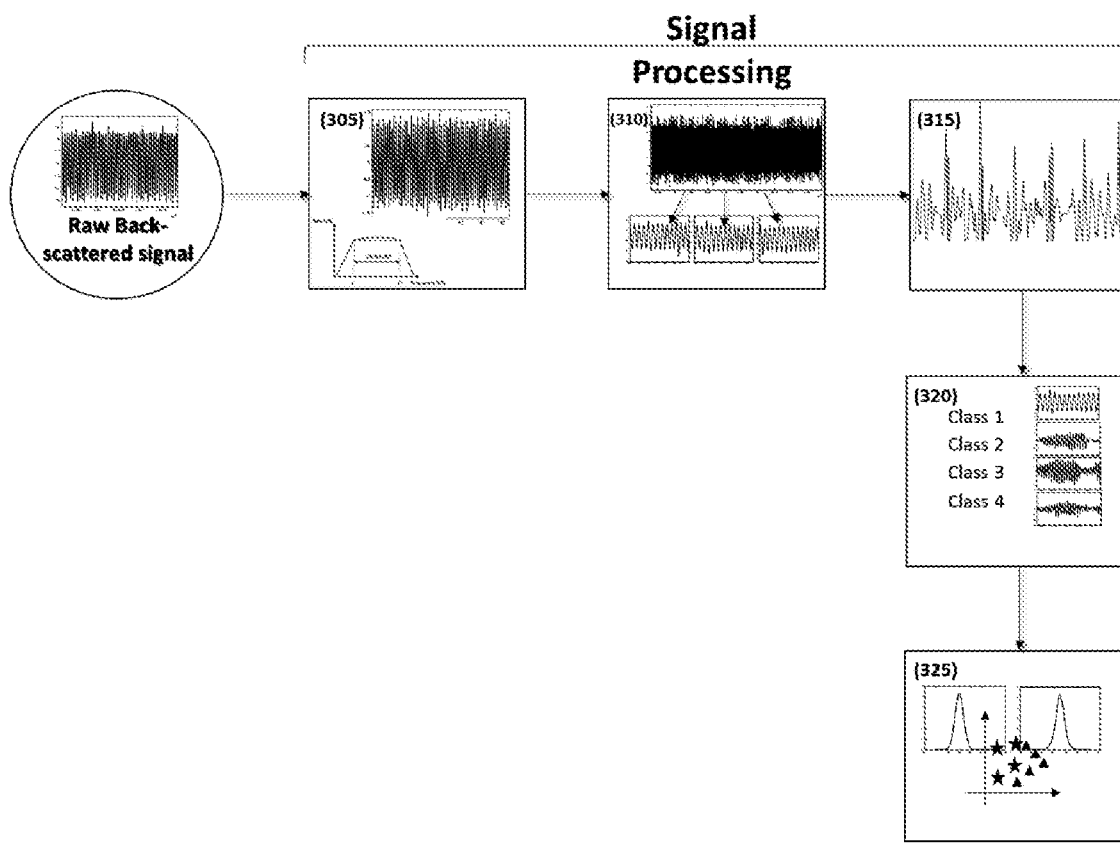
FIG. 3: Schematic representation of the signal processing flow according to an embodiment.

Reference is made to FIG. 3 to explain signal acquisition and processing. Back-scattered raw signal was acquired through a photodetector (PDA 36A-EC, Thor/abs) connected to an Analog-to-Digital converter (National Instruments DAQ) at a sampling rate of 5 kHz for all the Experiments (I-VII). After each acquisition, the original signal was passed through processing steps. During signal processing, the signal was at first filtered, using a second-order 500 Hz Butterworth high-pass filter (305), since the input irradiation laser was modulated using a 1 kHz sinusoidal signal, and to remove noisy low-frequency components of the acquired signal (e.g. 50 Hz electrical grid component). Then, the entire signal acquired for each particle and condition is split into epochs of 2 seconds (310). The z-score of each 2 seconds signal portion is computed in order to remove noisy signal epochs (315). 2 seconds z-scored signal portions which, in magnitude, exceeded the threshold value between 5-10 are removed (315). After these steps, it was possible to obtain a dataset with 2 s signal portions with a reasonable Signal to Noise Ratio (SNR) for the EVs type identification to be possible (320).

A total of 54 features are extracted (FIG. 3, 325) from the back-scattered signal to characterize each class that could be separated in two main types: time-domain and frequency-domain features. The first set can be divided into two subsets: time-domain statistics and time-domain histogram-derived features. The frequency-domain set is also divided into two groups: Discrete Cosine Transform (DCT)-derived features and Wavelet features. The 54 features considered are summarized in table 1.

The following time-domain statistics features are extracted from each 2-seconds signal portion: Standard Deviation (SD), Root Mean Square (RMS), Skewness (Skew), Kurtosis (Kurt), Interquartile Range (IQR), Entropy (E), considering its adequacy in differentiating with statistical significance synthetic particles from different types and yeast cells. Considering that the Nakagami distribution have been widely used to describe the back-scattered echo in statistical terms, mainly within the Biomedical area, the Probability Density Function (PDF)-derived $\mu_{Nakagami}$ and $\omega_{Nakagami}$ parameters that better fit the approximation of each 2-seconds signal portion distribution to the Nakagami distribution are also considered. These were the time-domain histogram-derived parameters considered in the classification. In total, eight features obtained through time-domain analysis of the back-scattered signal are used by the proposed method. Considering the ability to capture minimal periodicities of the analyzed signal, the associated coefficients being uncorrelated and due to the fact, in contrast to the Fast Fourier Transform (FFT), it does not inject high frequency artefacts in the transformed data, the Discrete Cosine Transform (DCT) is applied to the original short-term signal portions to extract frequency-derived information. Considering that the first n coefficients of the DCT of the scattering echo signal are defined by the following equation:

$$E_i^{DCT}[l] = \sum_{k=0}^{N-1} \epsilon_i[k]\cos\left[\frac{\pi l(2k+1)}{2N}\right], \text{ for } l = 1 \dots n, \quad (1)$$

in which $\epsilon_i$ is signal envelope estimated using the Hilbert transform; by sorting the DCT coefficients from the highest to the lowest value of magnitude and obtaining the following vector:

$$y_i = (E_i^{DCT}, \dots, E_i^{DCT}[l^n])^T, \quad (2)$$

in which $E^{DCT}_i[1^1]$ represents the highest DCT coefficient in magnitude, it is possible to determine the percentage of the total amount of the signal energy that each set of coefficients represent (organized from the highest to the lowest one). Each percentage value regarding each set of coefficients (from the first to the nth coefficient) can be obtained by dividing the norm of the vector formed by the first till the nth coefficient by the norm of the vector composed by all the n coefficients. Thus, the following DCT-derived features are used for characterizing each 2 s signal portion: the number of coefficients needed to represent about 98% of the total energy of the original signal ($N_{DCT}$), the first 20, 30 or 40 DCT coefficients extracted from the vector defined in (2), the Area Under the Curve (AUC) of the DCT spectrum for all the frequencies (from 0 to 2.5 kHz) ($AUC_{DCT}$), the maximum amplitude of the DCT spectrum ($Peak_{DCT}$) and the signal power spectrum obtained through the DCT considering all the values within the frequency range analyzed (from 0 to 2.5 kHz) ($P_{DCT}$)—please consult Table 1.

The remaining 12 features were extracted after 2-seconds signal portion decomposition using wavelets[21] (consult table 1). Two mother wavelets—Haar and Daubechies (Db10)—are selected to characterize each back-scattered signal portion. Six features for each type of mother Wavelet based on the relative power of the Wavelet packet-derived reconstructed signal (one to six levels) are therefore extracted from each short-term 2 seconds signal.

The disclosure is able to detect and identify different types of extracellular vesicles because extracts frequency derived features from the backscattering signal that are sensitive to particle's dimension, optical polarizability and microscopic refractive index.

As stated in Equation 3, nanoparticles motion is influenced by both the diffusivity D and the response of the particle to the optical potential that is exerted on it by the highly focused electromagnetic field. Therefore, the variability of the particle position along time is given by the Equation 3:

$$\sigma(t) = \frac{k_B T}{k_{potential}}\left[1 - e^{\left(-\frac{2k_{potential}Dt}{k_B T}\right)}\right] \quad (3)$$

Where $k_{potential}$ determines the response of the particle to the optical potential and depends on the particle polarizability $\alpha$, which is presented in equation 4:

$$k_{potential} = \left(\frac{2\pi}{c}\nabla I\right)\alpha \cdot \frac{1}{x}$$

Where $\nabla I$ represents the gradient of the electromagnetic field over 1D and x is the coordinate of given point in 1D subjected to the forces exerted by the applied electromagnetic field. The particle polarizability $\alpha$ is defined as:

$$\alpha = n_m^2 r^3 \left(\frac{\frac{n_p^2}{n_m} - 1}{\frac{n_p^2}{n_m} + 2}\right) \quad (4)$$

Where $n_p$ is the microscopic refractive index of the particle and $n_m$ is the refractive index of the media.

Equations 3 and 4 contrast with the "simpler" formulation used to describe the Brownian motion of nanoparticles in state-of-art methods (e.g. dynamic light scattering), which solely depends on the diffusivity D of the particle within the dispersion. This simple Brownian motion is given by the variability of the particle position along time ($\sigma(t)$):

$$\sigma(t) = 2Dt, \text{ and } D: \quad (5)$$

$$D = \frac{k_B T}{6\pi \eta r} \quad (6)$$

where $k_B$ is the Boltzmann constant, T is the absolute temperature, $\eta$ is the viscosity of the fluid and r the radius of the particle. Thus, this mathematical formulation of the Brownian motion states that the particle position along time ($\sigma(t)$) just depends on nanoparticles' radius.

Figure 4:
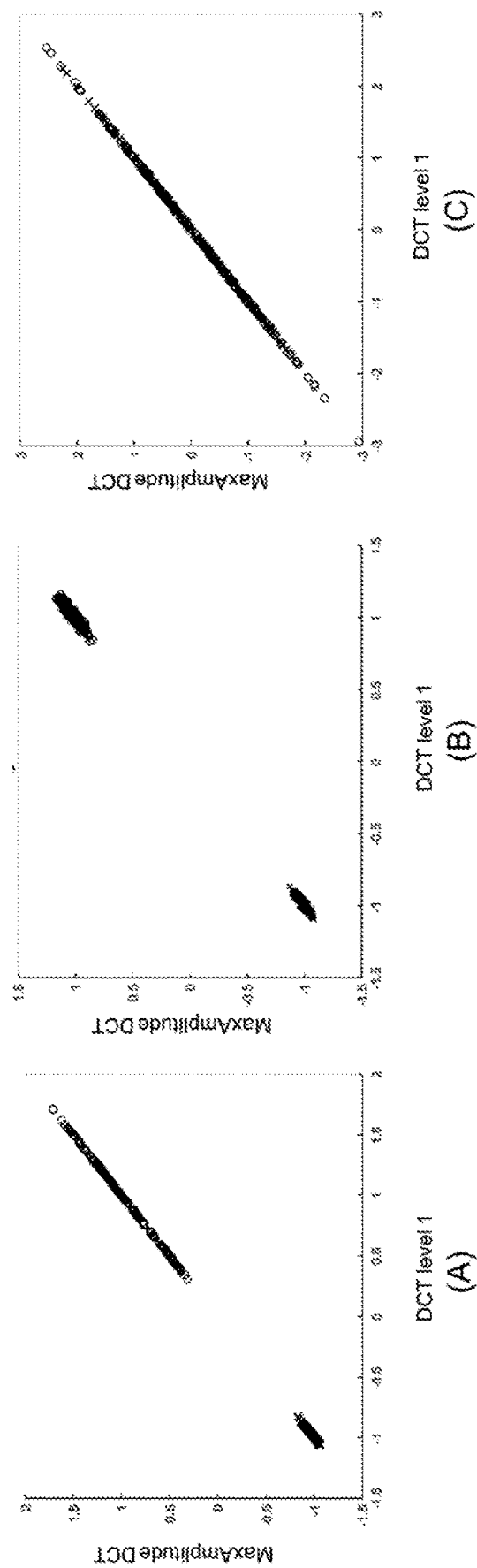
FIG. 4: Graphical representations of 2D distribution of the two most significant DCT-derived features extracted from the simulated for EVs type a and EVs type back-scattered signals (crosses vs circles)

Reference is made to FIG. 4 to illustrate the results obtained for the intensity of the light scattered by an ensemble of two populations of different EVs with approximately the same size (populations a and b) using theoretical simulations. Two populations of EVs a and b were used and are characterized by: $r_a$=100 nm, $r_b$=120 nm, and a ratio between $k_{potential,a}$ and $k_{potential,b}$ of 2. FIG. 4 highlights the instrumental role of considering optical polarizability and microscopic refractive index together with particle's dimension to obtain a perfect separation between two different classes of EVs (FIG. 4A), recapitulating the experimental results obtained in the lab (FIG. 4B). Class separation was not achieved when just the simple Brownian motion was considered (FIG. 4C).

A classification algorithm is used to detect EVs in liquid samples, namely Random Forests classifier.

Figure 5:
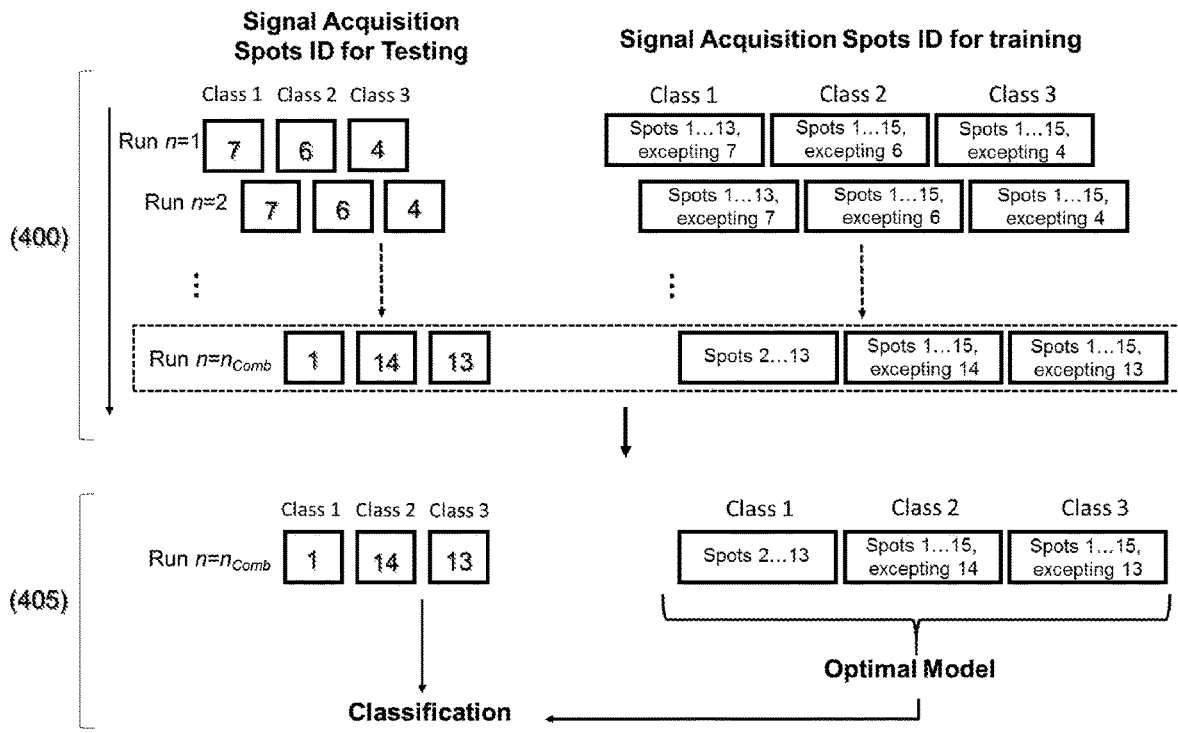
FIG. 5: Schematic representation according to an embodiment of how data is split for training and testing, considering an example of an experiment including three classes of particles, wherein by "n" is intended to represent the number of evaluation runs/number of different combinations between train and test sets.

Reference to FIG. 5 is made to explain the Leave-One-Out procedure (400), that was performed to ensure that the data used for evaluating the performance of a classifier belongs to a subject/entity who was never involved in the training. Thus, if a dataset is composed by data from n subjects/entities, the test set is divided in n testing rounds, in which, in each round, the data from a subject are used for test and the data from the remaining n−1 subjects are used for classifier training. In the next round, the data subset from another subject that was selected for training in the previous round is used separately for testing the classifier. Then, the classifier performance is determined based on the mean values obtained after the n testing rounds.

The above mentioned method and device was used in several experiments to prove its feasibility and potential for the aimed objective. Thus, Experiments II, IV V, VI and VII were designed not to individualize a specific particle and identify it, but instead to detect the presence of a given type of nanoparticles in solution, the above Leave-One-Out based method was slightly modified. The factor that differentiated the 2 seconds signal portions acquired during experiments involving nanoparticles and microparticles was the place where they were taken between acquisitions. Thus, signal portions used for test were acquired at different locations from the ones considered for training during the Experiments with nanoparticles, a way to avoid overfitting effects. Note that, in these cases, it was not possible to individualize particles due to their nanoscale dimensions and the inability of our fiber tools to trap them.

The most accurate classification rate for each one of the Experiments/Problems and nth evaluation run was obtained by determining the most suitable combination of values between the three parameters (FIG. 5; 405): number of trees, number of predictors to sample and minimum leaf size—please consult table 1. This combination, therefore, produces a classifier trained considering that combination of values (FIG. 5, 405). The most effective combination of these parameters was then determined using five-fold cross-validation (FIG. 5, 405), for each Experiment and evaluation run, during the training phase. However, training samples were normalized. Training samples mean value across each feature was subtracted to each data sample from that feature, and then divided by the corresponding feature standard deviation. Test input samples must be normalized also according to this procedure, using the previously obtained training mean and standard deviation for each feature. This allows to map the novel test features vectors in the training features space.

TABLE 1

List of parameters tuned during classifier training stage for model optimization.
Training Parameters

| | |
|---|---|
| Nr. of Trees | 5, 20, 30, 40, 50, 60, 70, 80, 90, 100 |
| Min. Leaf Size | 3, 5, 7 |

TABLE 1-continued

List of parameters tuned during classifier training stage for model optimization.
Training Parameters

| | |
|---|---|
| Nr. Predictors To Sample | 5, 7, 9, 11, 13, 15 |
| Nr. of Optimization Runs | 10 × 3 × 6 = 180 |

Nr. - Number.
Min. - Minimum.

The two selected cell lines and their EVs used in the Experiments II, VI, and VII were derived from the gastric cancer cell line MKN45: HST6, genetically modified to present shorter/truncated O-glycans at their surface, due to the over-expression of the ST6GalNAc1 sialyltransferase—and Mock—the corresponding control cells transfected with the empty vector that does not induce any change on O-glycans. The referred Mock and HST6 cancer cell lines only differ in the O-glycans (carbohydrates) attached to their surface.

Shorter or truncated O-glycans are considered predictive markers of poor prognosis in certain cancers. These phenomena are frequently associated with an incomplete glycans synthesis during cell glycosylation, in comparison with the cellular pathway under healthy conditions.

Experiment II tested the identification and classification of eukaryotic cells in Phosphate Buffered Saline (PBS) in a four-classes problem. Three types of solutions were prepared to test the proposed single-cell identification method. Two of them were composed by the differently glycosylated cancer cells described below—Mock and HST6—suspended in PBS (Phosphate-Buffered Saline, 1×). The third solution contained 8 µm Polystyrene (PS) synthetic microspheres also suspended in PBS (1×).

Experiment IV tested the identification and classification of bacterial cells in PBS in a three-classes problem: (1) "no particle trapped"; (2) "*Lactobacillus acidophilus* yogurt bacteria trapped", and (3) "*Streptococcus thermophilus* yogurt bacteria trapped" (target dimensions: 1.5-0.6 µm).

Experiments VI and VII tested the identification and classification of extracellular vesicles produced HST6 and Mock cells.

Experiment VI tested Mock- and HST6-derived exosomes suspended in PBS through the proposed method and device; Classes considered: "Class 1: No exosomes (only blank solution)"; "Class 2: Presence of Mock-derived exosomes in suspension" and "Class 3: Presence of HST6-derived exosomes in suspension".

Figure 6:
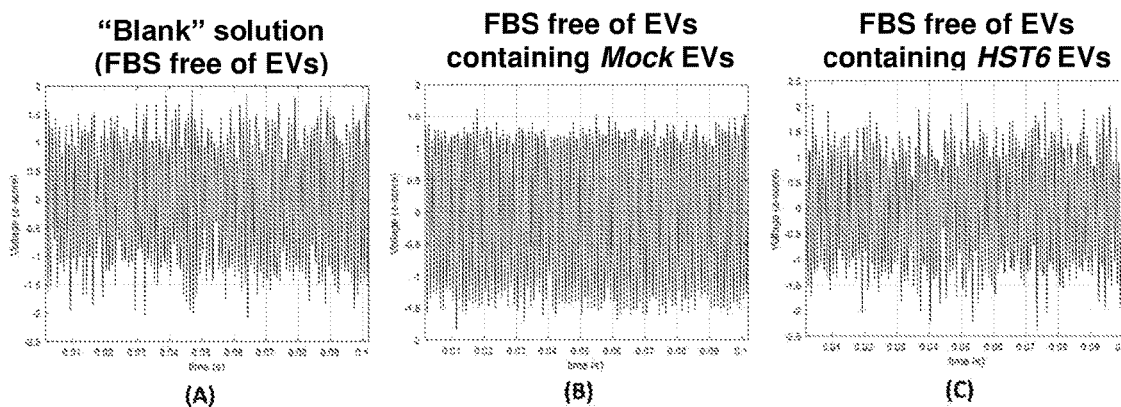
FIG. 6: Signal charts for an experiment for complex solutions containing complex biological nanoparticles.

Experiment VII was carried out in challenging conditions using PBS supplemented with Fetal Bovine Serum (FBS) to resuspend EVs, a complex liquid medium with high concentrations of proteins, sugars and lipids. This FBS was treated to remove the native EVs. FIG. 6 shows the backscattered signals obtained with three different types of samples: EV-free FBS with cell culture media (A), EV-free FBS supplemented with Mock EVs with cell culture media (B), and EV-FBS free supplemented with HST6 EVs with cell culture media (C).

Table 2 summarizes experimental results obtained with the present disclosure, in particular results regarding the differentiation performance between cells or EVs through the proposed method and device.

The term "comprising" whenever used in this document is intended to indicate the presence of stated features, integers, steps, components, but not to preclude the presence or addition of one or more other features, integers, steps, components or groups thereof. The disclosure should not be seen in any way restricted to the embodiments described and a person with ordinary skill in the art will foresee many possibilities to modifications thereof. The above described embodiments are combinable. The following claims further set out particular embodiments of the disclosure.

TABLE 2

Results of extracellular vesicles (EVs) identification in three different scenarios (Experiments V, VI and VII)

| | Class | Number of different acquisition spots | Total nr. of 2s signal portions | Nr. of test evaluation runs (n) | Nr. of train samples | Nr. of test samples | Test Accuracy | Test F-Measure |
|---|---|---|---|---|---|---|---|---|
| Experiment II | 1: No particle or cell | 16 | 852 | 1000 | 3183 ± 18 | 207 ± 18 | 0.963 ± 0.045 | 0.917 ± 0.101 |
| | 2: Mock cell | 18 | 813 | | | | | |
| | 3: HST6 cell | 16 | 903 | | | | | |
| | 4: PS particle | 16 | 821 | | | | | |
| Experiment IV | 1: No particle | 4 | 135 | 17 | 257 ± 6 | 97 ± 5 | 0.877 ± 0.047 | 0.808 ± 0.074 |
| | 2: Lactobacillus bacteria | 4 | 144 | | | | | |
| | 3: Streptococcus bacteria | 5 | 185 | | | | | |
| Experiment V | 1: Blank solution | 8 | 135 | 100 | 34 ± 0 | 38 ± 1 | 0.901 ± 0.130 | 0.865 ± 0.195 |
| | 2: 100 nm polystyrene nanoparticles | 7 | 95 | | | | | |
| Experiment VI | 1: Blank solution (PBS) | 10 | 290 | 500 | 790 ± 13 | 72 ± 13 | 0.918 ± 0.109 | 0.823 ± 0.209 |
| | 2: Mock EVs in PBS | 13 | 339 | | | | | |
| | 3: HST6 EVs in PBS | 15 | 433 | | | | | |
| Experiment VII | 1: Blank solution (FBS) | 13 | 390 | 500 | 851 ± 38 | 146 ± 36 | 0.982 ± 0.039 | 0.939 ± 0.127 |
| | 2: Mock EVs in FBS | 14 | 369 | | | | | |
| | 3: HST6 EVs in FBS | 14 | 369 | | | | | |

TABLE 3

EVs identification performance difference considering an exposed perpendicularly cleaved optical fiber and an optical fiber with the photoconcentrator on its extremity.

| | Assay I | | Assay II | |
|---|---|---|---|---|
| | F-Measure (%) | Accuracy (%) | F-Measure (%) | Accuracy (%) |
| | Culture Media with FBS (free of EVs) | Culture Media with FBS (free of EVs) | Culture Media with FBS (free of EVs) | Culture Media with FBS (free of EVs) |
| EVs concentration | 200 µL solution with EVs (1:1000) | 200 µL solution with EVs (1:1000) | 20 µL solution with EVs (1:10) | 20 µL solution with EVs (1:10) |
| Acquisition Height (h) | Fixed (only x, y random) | Fixed (only x, y random) | Random (all x, y, z values random) | Random (all x, y, z values random) |
| N (evaluation runs) | 300 | 300 | 300 | 300 |
| With photoconcentrator | 0.9430 ± 0.1195 | 0.9873 ± 0.0254 | 0.8443 ± 0.1718 | 0.9200 ± 0.0810 |
| Without photoconcentrator | — | — | 0.6980 ± 0.1788 | 0.7860 ± 0.1354 |

The invention claimed is:

1. A method for detecting extracellular vesicles while dispersed in a liquid dispersion sample, and for using an electronic data processor for classifying the sample as having, or not having, extracellular vesicles present, and for pre-training a machine learning classifier with a plurality of extracellular vesicle liquid dispersion specimens, while dispersed, the method comprising the steps of:
   emitting a laser modulated by a modulation frequency onto each specimen;
   capturing a temporal signal from laser light backscattered by each specimen for a plurality of temporal periods of a predetermined duration for each specimen;
   calculating specimen DCT or Wavelet transform coefficients from the captured signal for each of the temporal periods;
   using the calculated coefficients to pre-train the machine learning classifier;
   emitting, by a laser emitter having a focusing optical system coupled to the emitter, a laser modulated by a modulation frequency onto the sample;
   using a light receiver to capture a signal from laser light backscattered by the sample for a plurality of temporal periods of a predetermined duration;
   calculating sample DCT or Wavelet transform coefficients from the captured signal for each of the temporal periods; and
   using the pre-trained machine learning classifier to classify the calculated sample coefficients as having, or not having, extracellular vesicles present,
   wherein the extracellular vesicles have a particle size, in any particle direction, below 1 µm, and
   wherein the focusing optical system is a focusing optical system configured to provide a field gradient pattern.

2. The method according to claim 1, further comprising the electronic data processor classifying, if present, the extracellular vesicle into one of a plurality of extracellular vesicle classes by using the machine learning classifier which has been pre-trained using a plurality of extracellular vesicle liquid dispersion specimen classes.

3. The method according to claim 1, wherein the laser is further modulated by one or more additional modulation frequencies.

4. The method according to claim 1, wherein the specimen modulation frequency and the sample modulation frequency are identical.

5. The method according to claim 1, wherein the captured plurality of temporal periods of a predetermined duration are obtained by splitting a captured temporal signal of a longer duration than the predetermined duration.

6. The method according to claim 5, wherein the split temporal periods are overlapping temporal periods.

7. The method according to claim 1, wherein the electronic data processor is further arranged to pre-train and classify using time domain histogram-derived or time domain statistics-derived features from the captured signal, including features selected from the list consisting of: $w_{Nakagami}$; $\mu_{Nakagami}$; entropy; standard deviation; and combinations thereof.

8. The method according to claim 1, wherein the focusing optical system is a convergent lens having a polymeric photoconcentrator arranged at the tip of an optical fibre or waveguide.

9. The method according to claim 8, wherein the lens has a focusing spot corresponding to a beam waist of ⅓rd to ¼th of a base diameter of the lens.

10. The method according to claim 8, wherein the lens has a Numerical Aperture, NA, above 0.5.

11. The method according to claim 1, wherein the calculation of transform coefficients comprises selecting a minimum subset of transform coefficients such that a predetermined percentage of the total energy of the signal is preserved by the transform.

12. The method according to claim 1, further comprising signal capture of at least a sampling frequency of at least five times the modulation frequency.

13. A non-transitory storage media including program instructions for implementing a method for detecting extracellular vesicles in a liquid dispersion sample, the program instructions including instructions executable by an electronic data processor to carry out the method of claim 1.

14. A device for detecting extracellular vesicles while dispersed in a liquid dispersion sample, the device comprising:
a laser emitter;
a focusing optical system coupled to the emitter;
an infrared light receiver; and
an electronic data processor arranged to classify the sample as having, or not having, extracellular vesicles present using a machine learning classifier which has been pre-trained using a plurality of extracellular vesicle liquid dispersion specimens, while dispersed, by:
emitting a laser modulated by a modulation frequency onto each specimen;
capturing a temporal signal from laser light backscattered by each specimen for a plurality of temporal periods of a predetermined duration for each specimen;
calculating specimen DCT or Wavelet transform coefficients from the captured signal for each of the temporal periods;
using the calculated coefficients to pre-train the machine learning classifier;
wherein the electronic data processor is further arranged to:
use the laser emitter to emit a laser modulated by a modulation frequency onto the sample;
use the light receiver to capture a signal from laser light backscattered by the sample for a plurality of temporal periods of a predetermined duration;
calculate sample DCT or Wavelet transform coefficients from the captured signal for each of the temporal periods; and
use the pre-trained machine learning classifier to classify the calculated sample coefficients as having, or not having, extracellular vesicles present,
wherein the extracellular vesicles have a particle size, in any particle direction, below 1 μm, and
wherein the focusing optical system is a focusing optical system suitable to provide a field gradient pattern.

15. The device according to claim 14, wherein the electronic data processor is further arranged to classify, if present, the extracellular vesicle into one of a plurality of extracellular vesicle classes by using the machine learning classifier which has been pre-trained using a plurality of extracellular vesicle liquid dispersion specimen type-classes.

16. The device according to claim 14, wherein the laser is an infrared laser.

17. The device according to claim 14, wherein the split temporal periods are overlapping temporal periods.

18. The device according to claim 14, wherein the electronic data processor is further arranged to pre-train and classify using time domain histogram-derived or time domain statistics-derived features from the captured signal, including features selected from the list consisting of: $w_{Nakagami}$; $\mu_{Nakagami}$; entropy; standard deviation; and combinations thereof.

19. The device according to claim 14, wherein the focusing optical system is a convergent lens having a focusing spot corresponding to a beam waist of ⅓rd to ¼th of a base diameter of the lens.

* * * * *